United States Patent
Grossinger et al.

(10) Patent No.: US 9,552,074 B2
(45) Date of Patent: Jan. 24, 2017

(54) METHOD AND SYSTEM FOR GENERATING USER FEEDBACK OF A GESTURE CAPTURING DEVICE

(71) Applicant: Facebook, Inc., Menlo Park, CA (US)

(72) Inventors: Nadav Grossinger, Karmei Yosef (IL); Omer Kamerman, Kadima (IL)

(73) Assignee: Facebook, Inc., Menlo Park, CA (US)

( * ) Notice: Subject to any disclaimer, the term of this patent is extended or adjusted under 35 U.S.C. 154(b) by 20 days.

(21) Appl. No.: 14/718,148

(22) Filed: May 21, 2015

(65) Prior Publication Data

US 2015/0338923 A1  Nov. 26, 2015

Related U.S. Application Data

(60) Provisional application No. 62/001,070, filed on May 21, 2014.

(51) Int. Cl.
| | |
|---|---|
| G06F 3/01 | (2006.01) |
| H04M 1/02 | (2006.01) |
| G06F 3/03 | (2006.01) |

(52) U.S. Cl.
CPC ............. *G06F 3/017* (2013.01); *G06F 3/016* (2013.01); *G06F 3/0304* (2013.01); *H04M 1/0266* (2013.01)

(58) Field of Classification Search
CPC .......... H04M 1/02; H04M 1/0266; G06F 3/01; G06F 3/017; G06F 3/016; G06F 3/0304
USPC ....................... 455/556.1, 566; 345/619, 633
See application file for complete search history.

(56) References Cited

U.S. PATENT DOCUMENTS

| | | | |
|---|---|---|---|
| 8,379,101 B2* | 2/2013 | Mathe ............... | G06K 9/00342 348/222.1 |
| 2012/0195949 A1 | 8/2012 | Miuchi et al. | |
| 2014/0225918 A1* | 8/2014 | Mittal .................... | G06F 3/017 345/633 |
| 2015/0042680 A1 | 2/2015 | Grossinger et al. | |
| 2015/0198716 A1 | 7/2015 | Romano et al. | |
| 2015/0302648 A1* | 10/2015 | Zhang ................ | G01B 11/2513 345/426 |

FOREIGN PATENT DOCUMENTS

| | | |
|---|---|---|
| WO | WO 2013/088442 | 6/2013 |
| WO | WO 2015/059705 A1 | 4/2015 |

* cited by examiner

*Primary Examiner* — Raymond Dean
(74) *Attorney, Agent, or Firm* — Fenwick & West LLP

(57) ABSTRACT

A method and a system for generating user feedback of a gesture capturing device with content projection capability are provided herein. The method may include the following steps: projecting content, by a content projector, onto a projection surface; projecting patterned light, by a pattern projector, onto said projection surface and onto a maneuverable object controlled by a user; capturing reflections of the patterned light coming from said projection surface and said maneuverable object; calculating, based on said reflections, at least one of: a relative position and a relative orientation of at least two of: said projection surface, said maneuverable object, said content projector and said pattern projector; and generating a feedback, based on said calculated relative positions and/or orientations, wherein said feedback relates to a proper operation of the system, based on said relative position and a relative orientation, in view of predefined criteria.

22 Claims, 3 Drawing Sheets

METHOD AND SYSTEM FOR GENERATING USER FEEDBACK OF A GESTURE CAPTURING DEVICE

TECHNICAL FIELD

The present invention relates generally to gesture capturing devices and more particularly to such devices with content projection capabilities.

BACKGROUND OF THE INVENTION

Gesture and posture capturing devices have become very popular as users of consumer electronics devices learn to appreciate the advantages of natural gestures and postures as alternative to traditional user interface. It is understood that for the purpose of the discussion below, reference to gesture may include posture and vice versa.

One type of gesture capturing device is equipped with a content projector so that the display viewed by the user is in a form of a projection surface. The gesture capturing device of this kind is configured to detect a maneuverable object such as the hand of the user in the space between the device and the projection surface.

One of the techniques known in the art for detecting the position and the orientation of the maneuverable object is capturing and analyzing reflections of light (usually invisible) having a predefined pattern. The effectively of the gesture capturing process is dependent on a plurality of parameters such as range and angle between device and projection surface and the hand of the user and other metrics such as the illumination conditions and the intensity of the patterned light. One of the disadvantages of the prior art that the user is not aware of these parameters and cannot know at any given time if the sufficient conditions are met. The aforementioned problem is even worse in patterned light directed at 3D applications since and additional dimension which may also be subject to error is added.

As a result of not meeting the aforementioned conditions, a user who uses a gesture capturing device as an input device may not be able to use the device properly. This scenario undermines the overall user experience in natural user interface systems which are required to be more forgiving and intuitive than traditional user interface.

SUMMARY OF THE INVENTION

Some embodiments of the present invention overcome the aforementioned disadvantages of the prior art by providing a method and a system for generating user feedback of a gesture capturing device with content projection capability. The proposed method may include the following steps: projecting content, by a content projector, onto a projection surface; projecting patterned light, by a pattern projector, onto said projection surface and onto a maneuverable object controlled by a user; capturing reflections of the patterned light coming from said projection surface and said maneuverable object; calculating, based on said reflections, at least one of a relative position and a relative orientation of at least two of: said projection surface, said maneuverable object, said content projector, and said pattern projector; and generating a feedback, based on said calculated relative positions and/or orientations, wherein said feedback is instructive of acceptable values of said relative position and a relative orientation, based on predefined criteria.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
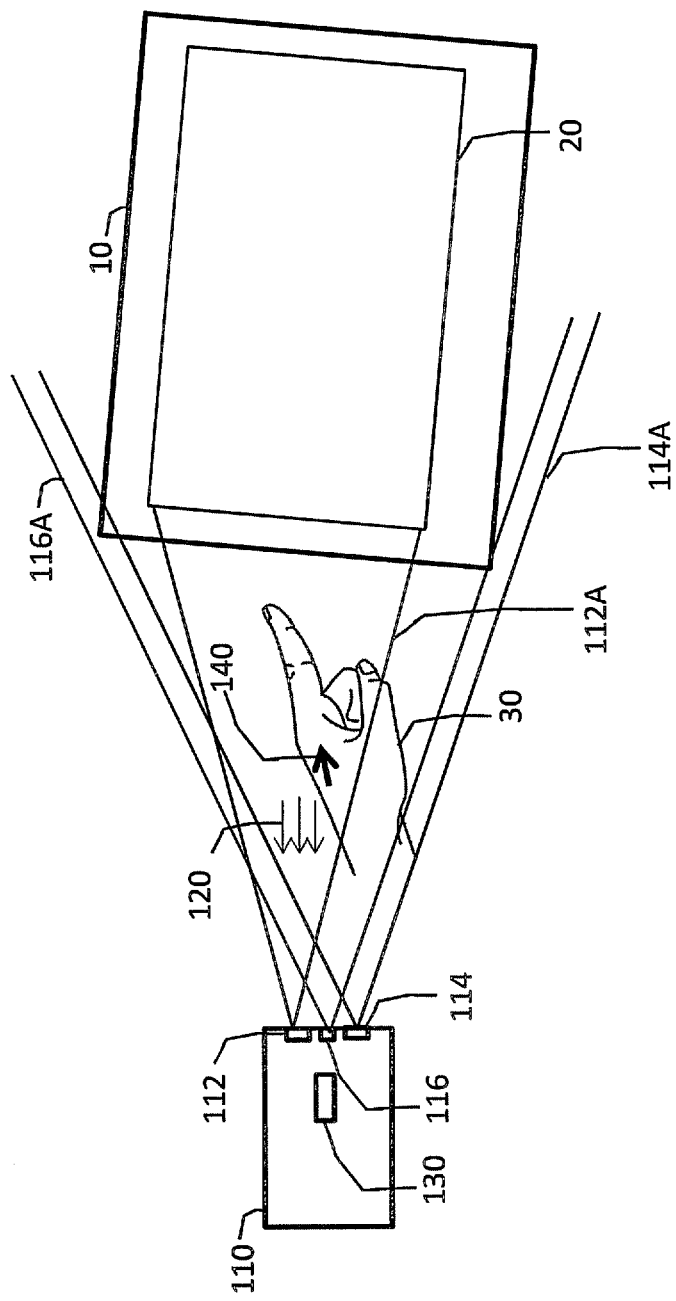
FIG. 1 is a schematic block diagram illustrating the device according to one embodiment of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

For providing further details of how structured light can be implemented, by way of illustration only, the following applications are incorporated herein by reference in their entirety: U.S. patent application Ser. No. 13/497,586, WIPO Publication Number WO2013088442, both of which are incorporated by reference in their entirety.

FIG. 1 is a schematic diagram illustrating a system 110 according to some embodiments of the present invention. System 110 may be implemented in a form of any user equipment (UE) such as a smart telephone, or a tablet personal computer (PC). System 110 may include a content projector 112 which may be an optical micro projector configured to project content 20, as in projection cone 112A, possibly but not mandatory onto a projection surface 10. System 110 may further include a pattern projector 114 configured to project a patterned light cone 114A onto projection surface 10 and onto a maneuverable object 30 controlled by a user, such as the user's hand. For example, embodiments of the present invention may typically use structured light. The light may be produced by laser through a projector or optical fibers or a scanner. The structure may involve spots or parallel lines or a grid or the like, or combinations of different structures may be used.

System 110 may further include a capturing device 116, such as a digital camera or any imagery sensor which may be based, for example on a complementary metal oxide silicon (CMOS) array. Capturing device 116 may be configured to capture, within capturing cone 116A, reflections 120 of the patterned light coming from projection surface 10 and also from maneuverable object 30. System 110 may further include a computer processor 130 such as an integrated circuit (IC) forming the processor of a smartphone on which a dedicated software is loaded. Computer processor 130 is in operative association with content projector 112, pattern projector 114, and capturing device 116.

In operation, computer processor 130 is configured to calculate, based on reflections 120 received at capturing device 116 at least one of: a relative position and a relative orientation of predefined paired objects. The relative position may be represented mathematically as a vector of displacement in the 3D space and the relative orientation may be represented mathematically by roll-tilt-cant vector. These paired objects can be any paired combination of: projection surface 10, maneuverable object 30, content projector 112, and pattern projector 114. Furthermore, computer processor 130 may be configured to provide a feedback 140 to the user, based on the calculated relative positions and/or orientations. More specifically, the feedback may be instructive of how to reach values of relative position and a relative orientation which are acceptable for a proper operation of the device, based on predefined criteria. The feedback may take many forms and can be preferably a visual indicator presented to the user and having instructive nature as to the change required in the relative position and/or orientation.

By way of example, a device which projects an image of a keyboard and uses patterned light in order to track the user's fingers so as to implement a virtual keyboard. A possible feedback may include visible light arrows used to instruct the user how to place or to direct his or her fingers and alert them whenever their fingers are not aligned with the keyboard, from a projected keyboard perspective.

According to some embodiments of the present invention, the content projector, the pattern projector, the capturing device, and the computer processor form a single monolithic device, such as a smart telephone or a tablet PC. Specifically, the projectors may be embedded in the platform.

According to some embodiments of the present invention, the maneuverable object may be any bodily part of the user and not limited to a hand. Furthermore it can be any object held by the user or controlled by the user.

According to some embodiments of the present invention, the feedback may include visual content that is projected somewhere in the scene so that the user can see it. It can be projected by the content projector or another projector. Specifically, the feedback may be projected onto the hand of the user.

According to some embodiments of the present invention, the computer processor is further configured to detect an improper position and/or orientation of the maneuverable object, based on a portion of the maneuverable object captured by the image capturing device. The improper position and/or orientation of the maneuverable object relate to insufficient data as to for example a location of a pointing tip of the maneuverable object vis à vis the projection surface. Specially, there might be blind spots where the tip of the hand of the user is not recognized and its location cannot be even estimated.

According to some embodiments of the present invention, the feedback is indicative of a relationship or correlation between at least part of the content that is effectively projected onto the projection surface 10 and an original content (being the content originally projected form the projected, without distortion or obstructions) projected by the content projector. This way, the feedback can provide indication as to the quality of the projection. An example is a surface that is unsuitable for projection and the feedback indicates the user to project on a more suitable surface.

According to some embodiments of the present invention, the feedback is indicative of a sufficiency of the reflections of the patterned light. Specifically, the intensity of the pattern is sometimes crucial in order to achieve good tracking results. In some illumination environments or others, the intensity of the patterned light may be too weak. The user is notified and he or she can move to a darker environment which may improve the performance.

According to some embodiments of the present invention, the feedback comprises at least one of: visual indicator, and auditory indicator.

According to some embodiments of the present invention, the feedback comprises directional symbols instructive of an adjustment to be carried out, for example by the user or by the device. A possible non-limiting example would be directive arrows leading the user to move the device towards the direction of indication.

According to some embodiments of the present invention, the computer processor is further configured to calculate an optimal route, in position and orientation terms, for adjusting said measured position and orientation to acceptable values, wherein the feedback instructive of the optimal route.

According to some embodiments of the present invention, the optimal route is calculated by applying a cost function to a plurality of parameters for improving ergonomics of operating the system.

According to some embodiments of the present invention, the system is embedded in a mobile phone which has at least two modes: a hand held mode in which the mobile phone is hand held and the content is projected parallel to a plane defined by the mobile phone, and a touch pad mode in which the mobile phone is stationary and the content is projected perpendicular to said plane.

According to some embodiments of the present invention, in an alternative implementation, the system may include: a content projector configured to project content onto a projection surface; a pattern projector configured to project a patterned light onto said projection surface and onto a maneuverable object controlled by a user; a capturing device configured to capture reflections of the patterned light coming from said projection surface and said maneuverable object; and a computer processor configured to derive lighting conditions associated with the maneuverable object and the projection surface as detected by said reflections, and generate a feedback to the user, indicative of a sufficiency of lighting conditions, based on predefined criteria.

Figure 2:
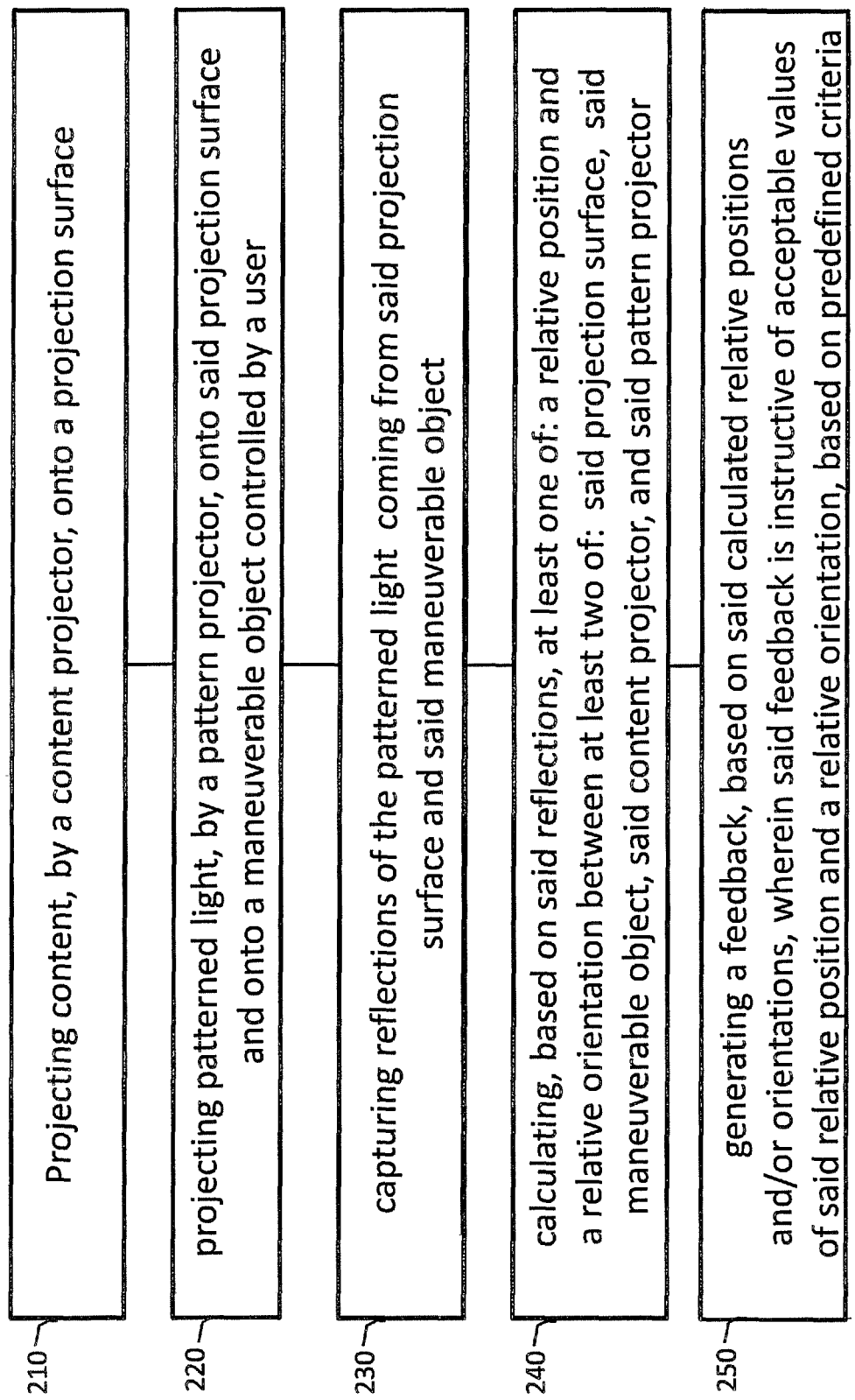
FIG. 2 is a high level flowchart illustrating a method according to some embodiments of the present invention.

FIG. 2 is a high level flowchart illustrating a method according to some embodiments of the present invention. Method 200 may be implemented in a different architecture than system 110 disclosed herein. Method 200 may include the following steps: projecting content, by a content projector, onto a projection surface 210 It should be understood that the content may be further present over a display at the device in a case of a tablet PC or a smartphone, on top of being projected by the projector; projecting patterned light, by a pattern projector, onto said projection surface and onto a maneuverable object controlled by a user 220; capturing reflections of the patterned light coming from said projection surface and said maneuverable object 230; calculating, based on said reflections, at least one of: a relative position and a relative orientation of at least two of: said projection surface, said maneuverable object, said content projector, and said pattern projector 240; and generating a feedback, based on said calculated relative positions and/or orientations, wherein said feedback is instructive of acceptable values of said relative position and a relative orientation, based on predefined criteria 250.

Figure 3:
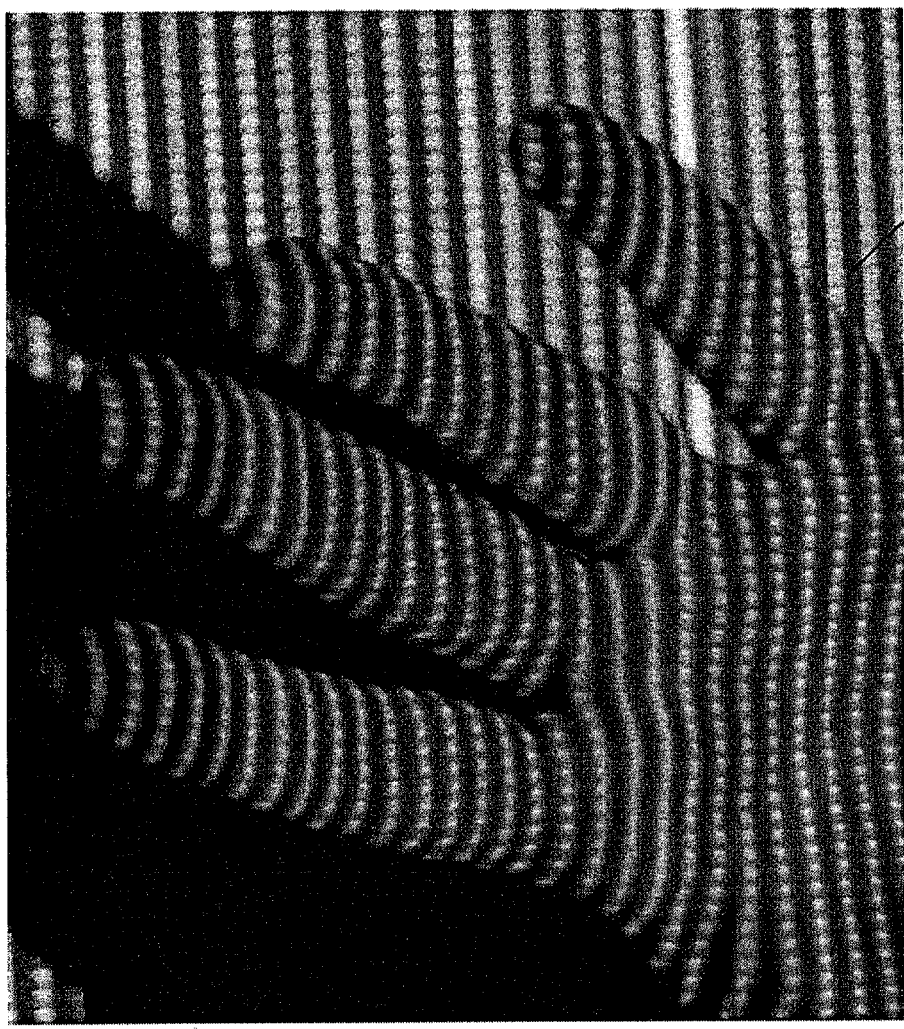
FIG. 3 is a non-limiting exemplary image of real-life light pattern according to some embodiments of the present invention.

Some embodiments of the present invention address the challenge of identifying boundaries of proper operation of the device in three dimensional environment which is more complicated than two dimensional primarily because not all of the maneuverable object (i.e., the hand) is fully captured and so predictions have to be made in regards with the position and orientation of the objects participating in the process of gesture capturing. Additional challenges are caused as a result of the movement in 3D, e.g., the user may place his or her hand not within the correct boundaries. This challenge is exemplified, in some embodiment by using a stripe-like pattern as depicted in FIG. 3 which schematically illustrates a hand projected with a light pattern having an intensity notation, according to an exemplary embodiment of the present invention. In certain cases, stripe segments reflected from background of the hand may unite with stripe segments reflected from the hand. Consequently, the stripe segment clusters of the palm and digits cannot be found, and the hands cannot be tracked.

One way that may help overcome the stripe segment unification problem is through introduction of a periodic notation along each stripe, as illustrated in FIG. 3.

Optionally, the notation is in a form of a light intensity 320, which changes along the stripe, or a specific shape that appears in a constant distance along the stripe, such as a short vertical line.

Further to the introduction of the periodic notation, the camera is positioned with respect to the light projector, with a gap in the X-axis, as well as the gap in the Y-axis discussed in further detail hereinabove. This gap in the X-axis creates a phase shift in the position of the notations along the stripes with respect to the object's distance.

Consequently, in cases in which the stripe segments reflected from the hands unite with strip segments reflected from the background, the segments still have different phases of the periodic notation. Optionally, the ratio of the vertical and horizontal distances between the camera and the light projector is carefully selected, so as to maximize the notation's phase shift between the segments when the segments unite.

A second way which may prove useful for overcoming the problem of the united segments is by changing the setup of the camera and light projector, so as to differ in their Z-axis positions too.

A difference in Z-axis positioning between the camera and the light projector may be brought about either by physically positioning the camera and light projector in different Z-axis positions or by deployment of a negative or positive lens in front of the projected pattern at a certain distance.

Consequently, the stripe segments of the light pattern reflected from the object have different periods at different object distances. Therefore, even if one of the stripe segments reflected from the hand unites with a stripe segment reflected from the background, adjacent lines do not unite because of the different periods.

A third way which may prove useful for overcoming the problem of the united segments, is carried out using a micro structured element, which converts the light beam into a light beam of a varying cross sectional intensity profile, as described in further detail hereinabove.

The cross sectional intensity profile changes according to distance of an object which reflects the light pattern, from the light projector.

Consequently, the cross sectional intensity profile of the stripe segments reflected from the hand and the cross sectional intensity profile of the stripe segments reflected from the background, are different, as described in further detail hereinabove.

A method according to an exemplary embodiment of the present invention may further include tracking of depth movement of the hand's digit, by detecting a vertical movement of the cluster of stripe segments created by segmentation of stripes by the digit, a horizontal movement of notations on the stripe segments, or both.

Optionally, the tracking of the depth movement of the digit is carried out by detecting a vertical movement of the uppermost segment in the cluster of stripe segments created by segmentation of stripes by the digit. The uppermost segment represents the tip of the digit, which performs the digit's most significant movement in the Z-Y plane.

Optionally, the tracking of the depth movement is carried out by detecting a change in number of segments in the tracked cluster. That is to that a depth movement of the hand finger (i.e. movement in the Z-axis) may cause one of the tracked stripe segments of the digit to move upwards and disappear, cause a new stripe segment to appear, etc.

The feedback mechanism described above is particularly beneficial for addressing boundary problems in patterned light focusing on 3D posture and gesture recognition.

In another embodiment, the feedback may take the form of coloring the fingertip of the hand of the user (the hand being the maneuverable object) according to the finger location. For example, red color would indicate out of boundary and green color may confirm that the hand is captured properly and operations such as clicking and the like.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
   a content projector configured to project content onto a projection surface;
   a pattern projector configured to project a patterned light onto the projection surface and onto a maneuverable object controlled by a user;
   a capturing device configured to capture reflections of the patterned light coming from the projection surface and the maneuverable object; and
   a computer processor configured to calculate, based on the reflections, at least one of: a relative position and a relative orientation of at least two of: the projection surface, the maneuverable object, the content projector and the pattern projector,
   wherein the computer processor is further configured to provide a feedback to the user, based on the calculated relative positions and/or orientations and, wherein the feedback relates to an operation of the system, based on the relative position and the relative orientation, in view of predefined criteria.

2. The system of claim 1, wherein the content projector, the pattern projector, the capturing device, and the computer processor form a single monolithic device.

3. The system of claim 1, wherein the maneuverable object is a bodily part of the user.

4. The system of claim 1, wherein the feedback comprises visual content.

5. The system of claim 1, wherein the feedback comprises visual content and is projected onto the maneuverable object.

6. The system of claim 1, wherein the computer processor is further configured to detect an improper position and/or orientation of the maneuverable object that undermines an operation of the system, based on a portion of the maneuverable object captured by the image capturing device.

7. The system of claim 6, wherein the improper position and/or orientation of the maneuverable object relate to insufficient data as to a location of a tip of the maneuverable object vis à vis the projection surface.

8. The system of claim 1, wherein the feedback is indicative of a relationship between a part of the content that is effectively projected onto the projection surface and an original content projected by the content projector.

9. The system of claim 1, wherein the feedback is indicative of a sufficiency of the reflections of the patterned light.

10. The system of claim 1, wherein the feedback comprises at least one of: visual indicator, and auditory indicator.

11. The system of claim 1, wherein the feedback comprises directional symbols instructive of an adjustment to be carried out.

12. The system of claim 1, wherein the computer processor is further configured to calculate an optimal route, in position and orientation terms, for adjusting the relative position and the relative orientation to acceptable values, wherein the feedback is instructive of the optimal route.

13. A mobile phone comprising:
    a content projector configured to project content onto a projection surface;
    a pattern projector configured to project a patterned light onto the projection surface and onto a maneuverable object controlled by a user;
    an capturing device configured to capture reflections of the patterned light coming from the projection surface and the maneuverable object; and
    a computer processor configured to calculate, based on the reflections, at least one of: a relative position and a relative orientation of at least two of: the projection surface, the maneuverable object, the content projector and the pattern projector,
    wherein the computer processor is further configured to provide a feedback to the user, based on the calculated relative positions and/or orientations and, wherein the feedback relates to a proper operation of the system, based on the relative position and the relative orientation, in view of predefined criteria,
    wherein the mobile phone has at least two modes: a hand held mode in which the mobile phone is hand held and the content is projected parallel to a plane defined by the mobile phone, and a touch pad mode in which the mobile phone is stationary and the content is projected perpendicular to the plane.

14. A method comprising:
    projecting content, by a content projector, onto a projection surface;

projecting patterned light, by a pattern projector, onto the projection surface and onto a maneuverable object controlled by a user;

capturing reflections of the patterned light coming from the projection surface and the maneuverable object;

calculating, based on the reflections, at least one of: a relative position and a relative orientation of at least two of: the projection surface, the maneuverable object, the content projector, and the pattern projector; and generating a feedback, based on the calculated relative positions and/or orientations, wherein the feedback relates to an operation of a system comprising the projection surface, the maneuverable object, the content projector, and the pattern projector, based on the relative position and the relative orientation, in view of predefined criteria.

15. The method of claim 14, wherein the content projector and the pattern projector form a single monolithic device.

16. The method of claim 14, wherein the maneuverable object is a bodily part of the user.

17. The method of claim 14, wherein the feedback comprises visual content and is projected.

18. The method of claim 14, wherein the feedback is indicative of a ratio between a part of the content that is effectively projected onto the projection surface and an original content projected by the content projector.

19. The method of claim 14, wherein the feedback is indicative of a sufficiency of the reflections of the patterned light.

20. The method of claim 14, wherein the feedback comprises at least one of: visual indicator, auditory indicator.

21. The method of claim 14, wherein the feedback comprises directional symbols instructive of an adjustment to be carried out.

22. A method comprising:

projecting content, by a content projector, onto a projection surface;

projecting patterned light, by a pattern projector, onto the projection surface and onto a maneuverable object controlled by a user;

capturing reflections of the patterned light coming from the projection surface and the maneuverable object;

calculating, based on the reflections, at least one of: a relative position and a relative orientation of at least two of: the projection surface, the maneuverable object, the content projector, and the pattern projector;

deriving lighting conditions associated with the maneuverable object and the projection surface as detected by the reflections, the lighting conditions indicative of intensities of the patterned light reflected from the maneuverable object and the projection surface; and generating, based on the calculated relative positions and/or orientations, a feedback as a visual indicator or an auditory indicator presented to the user, indicative of a sufficiency of the lighting conditions, based on predefined criteria, wherein the feedback comprises an instruction to carry out an adjustment in relation to at least one of: the maneuverable object, the content projector, the pattern projector and the projection surface, in accordance with the sufficiency of the lightning conditions.

* * * * *